(12) United States Patent
Okamoto et al.

(10) Patent No.: US 7,046,327 B2
(45) Date of Patent: May 16, 2006

(54) LIQUID CRYSTAL DISPLAY DEVICE INCLUDING COLUMNAR SPACER ABOVE GATE LINE

(75) Inventors: Mamoru Okamoto, Kanagawa (JP); Shinichi Nishida, Kanagawa (JP); Takayuki Konno, Kanagawa (JP); Muneo Maruyama, Kanagawa (JP)

(73) Assignee: NEC Corporation (JP)

( * ) Notice: Subject to any disclaimer, the term of this patent is extended or adjusted under 35 U.S.C. 154(b) by 184 days.

(21) Appl. No.: 10/833,318

(22) Filed: Apr. 28, 2004

(65) Prior Publication Data

US 2004/0233378 A1    Nov. 25, 2004

(30) Foreign Application Priority Data

May 23, 2003   (JP)   ............... 2003-146093

(51) Int. Cl.
*G02F 1/1339*   (2006.01)
*G02F 1/1337*   (2006.01)

(52) U.S. Cl. ............. 349/155; 349/123; 349/156
(58) Field of Classification Search ............... 349/155, 349/156
See application file for complete search history.

(56) References Cited

U.S. PATENT DOCUMENTS 6,549,260 B1 * 4/2003 Shibahara ............ 349/155

6,816,210 B1 * 11/2004 Chen ................... 349/44
2005/0046779 A1 * 3/2005 Sumi et al. ............ 349/155

FOREIGN PATENT DOCUMENTS

JP    11-218771    8/1999

* cited by examiner

*Primary Examiner*—Tarifur R. Chowdhury
(74) *Attorney, Agent, or Firm*—Dickstein, Shapiro, Morin & Oshinsky, LLP.

(57) ABSTRACT

A liquid crystal display device using columnar spacers to eliminate an influence of shades in rubbing an orientation film and to eliminate remaining of display unevenness (black haze) in black display is provided. Columnar spacers are provided above a black matrix of an opposite substrate disposed opposite to a TFT substrate. A position of a top of each columnar spacer in contact with the TFT substrate is shifted from a center of a gate line of the TFT substrate toward a common line parallel to the gate line. Moreover, a structure is adopted, in which the top of the columnar spacer contacting with the TFT substrate is not entirely brought into contact with the TFT substrate, but a gap is provided between a part of the top of the columnar spacer and the TFT substrate by providing an irregular surface on the top of the columnar spacer or the like. This gap can reduce frictional force between the top of the columnar spacer and the TFT substrate to result in restricting an occurrence of the black haze when external force is applied to a screen of the liquid crystal display device.

7 Claims, 6 Drawing Sheets

LIQUID CRYSTAL DISPLAY DEVICE INCLUDING COLUMNAR SPACER ABOVE GATE LINE

BACKGROUND OF THE INVENTION

1. Field of the Invention

The present invention relates to a liquid crystal display device, and particularly to a liquid crystal display device which controls a gap between two substrates thereof by using columnar spacers.

2. Description of the Related Art

A liquid crystal display device is configured by inserting a liquid crystal layer between a thin-film transistor (TFT) substrate and an opposite substrate. Columnar spacers are used for holding a gap between the TFT substrate and the opposite substrate.

On the opposite substrate, light shielding means which surrounds one or plural pixels is disposed in a grid shape. This light shielding means is called a black matrix. In the case of providing the columnar spacers on the opposite substrate, the columnar spacers are formed on portions shielded by the grid-shaped black matrix so as not to affect an aperture ratio of the liquid crystal display device. Usually, the columnar spacers are arranged on widthwise center portions of the black matrix. Above the TFT substrate, the columnar spacers are arranged on intersections of scan lines and signal lines.

After the columnar spacers are provided on the black matrix of the opposite substrate, an orientation film made of polyimide resin or the like is formed on the opposite substrate including surfaces of the columnar spacers. A treatment called rubbing is performed for a surface of the orientation film in order to impart thereto controllability for liquid crystal orientation. However, the columnar spacers are formed in a protrusion shape. For this reason, in a peripheral portion of each columnar spacer, a shaded portion where rubbing becomes insufficient sometimes occurs in a rubbing step. On such a surface of the orientation film, which has been shaded in the rubbing, the liquid crystal orientation becomes disturbed because sufficient controllability for the liquid crystal orientation cannot be imparted to the surface concerned, thus causing light leakage.

A solution technology for such a problem in the case of using the columnar spacers is disclosed in Japanese Patent Laid-Open Publication No. H11-218771 (published in 1999). In a liquid crystal display device in this publication, arranged positions of columnar spacers are set at positions which are adjacent to intersections of a square black matrix disposed in a grid shape and shifted to an upstream side of rubbing. These positions are set such that shades in the rubbing remain within a plane of the black matrix. With this arrangement structure, almost all of the shades in the rubbing are made to remain within a region of the light shielding means.

However, even with such a structure as described above, there remains a problem of "black haze" which remains after application of external force to a screen of the liquid crystal display device and removal thereof. For example, in the case where the screen of the liquid crystal display device is pushed by hand or the like and then released when black is displayed, display unevenness remains on a portion of the screen, which has been pushed by hand, without disappearing for a while. This display unevenness is caused by frictional force between the columnar spacers provided on the opposite substrate and the surface of the TFT substrate. When the frictional force is large, the display unevenness remains for a long period of time.

SUMMARY OF THE INVENTION

The prevent invention is one invented in order to solve the problem described above. Specifically, it is an object of the present invention to provide a liquid crystal display device capable of eliminating an influence of shades (area where rubbing is insufficient) in rubbing an orientation film, the shades occurring due to columnar spacers, and capable of eliminating remaining of display unevenness (black haze) when black is displayed.

The liquid crystal display device of the present invention includes a first substrate, a second substrate, and a liquid crystal layer sandwiched between the first and second substrates. On the first substrate, there are sequentially provided a gate line, a common line parallel to the gate line, a data line intersecting the gate line while sandwiching a gate insulating film on the gate line therebetween, a first interlayer insulating film coating the data line, and a first orientation film. Meanwhile, on the second substrate, there are sequentially provided a light shielding film opposite to the gate line, a second interlayer insulating film coating the light shielding film, and a columnar spacer on the second interlayer insulating film. This columnar spacer is located on the second interlayer insulating film and arranged above the gate line apart from an intersection of the gate line and the data line. Furthermore, a second orientation film coating the second interlayer insulating film and the columnar spacer is provided thereon. A center of a top of the columnar spacer, which is directed to the first substrate, is shifted from above a center of the gate line toward above the common line. In addition, the top of the columnar spacer, which is directed to the first substrate, partially overruns from above the gate line when viewed from the above.

The liquid crystal display device of the present invention mainly has application modes as below.

First, among a portion of the top of the columnar spacer, which overruns from above the gate line when viewed from the above, the top being directed to the first substrate, at least an end portion toward the common line does not contact with the first orientation film.

Next, a surface of the first orientation film is formed into an irregular shape. This irregular surface of the first orientation film reduces frictional force between the top of the columnar spacer, which is directed to the first substrate, and the first orientation film.

Next, a common electrode connected to the common line and formed between the first interlayer insulating film and the first orientation film is further provided on the first substrate, and the common electrode is located nearer the liquid crystal layer than the data line is, and includes the data line when viewed from the above. In addition, the common electrode coats a protruding organic insulating film provided between the first interlayer insulating film and the first orientation film above the data line. A pixel electrode parallel to the common electrode is further provided between the first interlayer insulating film and the first orientation film, and liquid crystal molecules of the liquid crystal layer are rotated by applying voltage between the common electrode and the pixel electrode.

Moreover, a plurality of the gate lines and a plurality of the data lines are provided individually on the first substrate, and a plurality of pixels are defined by a plurality of regions surrounded by the plurality of gate lines and the plurality of data lines. In addition, on the second substrate, as well as a light shielding film opposite to the gate lines, a color layer is provided in the same layer as the light shielding film correspondingly to the plurality of pixels.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE PREFERRED EMBODIMENTS

Figure 1:
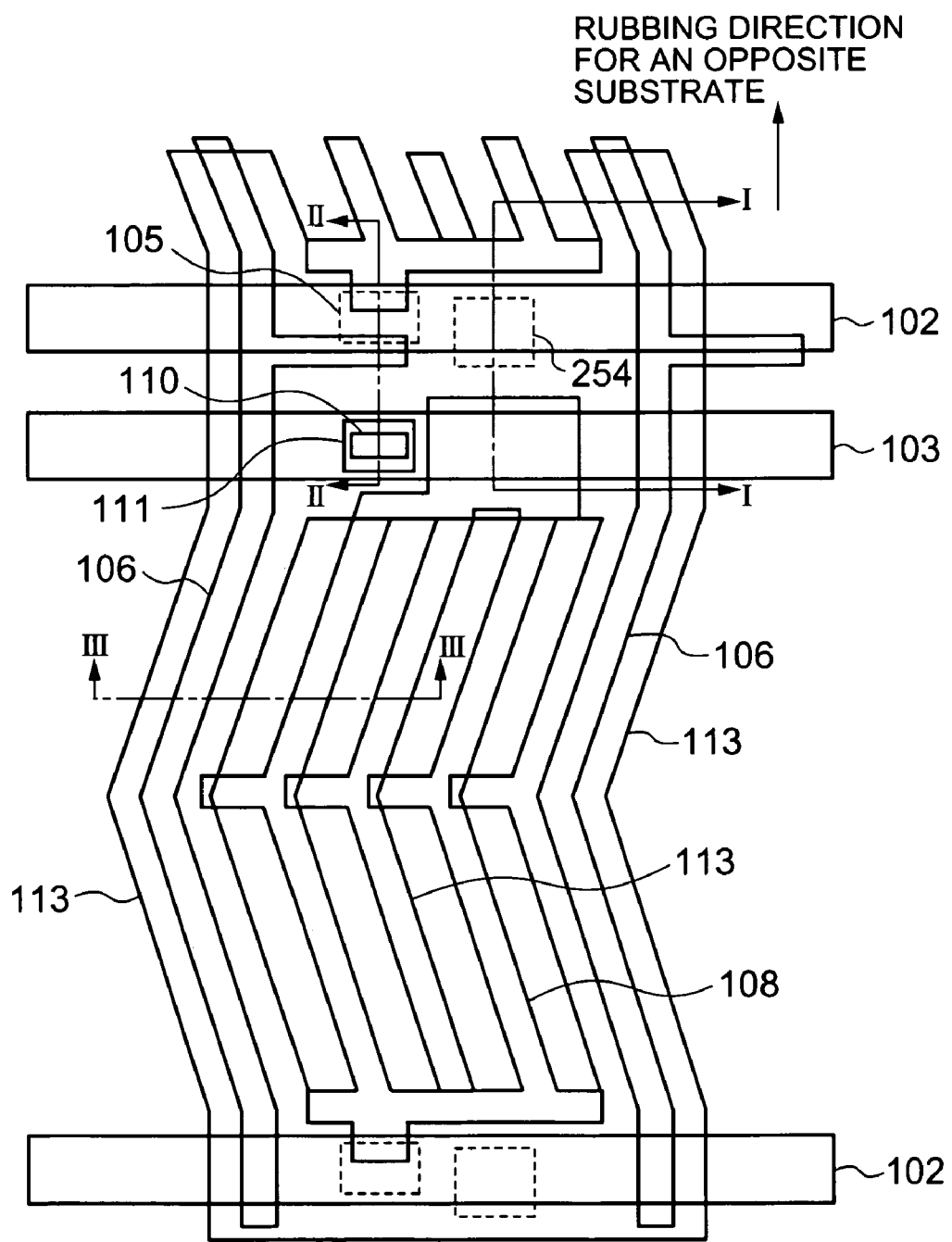
FIG. 1 is a plan view of one pixel on a TFT substrate of an active matrix liquid crystal display device of in-plane switching mode in an embodiment of the present invention.

A liquid crystal display device of the present invention will be described by taking as an example an active matrix liquid crystal display device of in-plane switching mode with reference to FIG. 1 to FIG. 4.

On a first transparent substrate 101 made of a glass substrate, a gate line 102 and a common line 103, each of which is made of molybdenum with a thickness of, for example, 200 to 400 nm, are provided. The common line 103 is provided parallel to the gate line 102. A silicon oxide film and a silicon nitride film are sequentially sputtered so as to coat the gate line 102 and the common line 103, and a gate insulating film 104 with a thickness of 300 to 500 nm is formed. On the gate insulating film 104, a semiconductor layer 105 made of a silicon film is formed so as to overlap the gate line 102. On both ends of the semiconductor layer 105, formed are a data line 106 and a source electrode 107, each of which is made of molybdenum with a thickness of, for example, 200 to 400 nm, and a pixel electrode 108 in a bent shape pattern, which is extended from the source electrode 107.

Next, a nitride film such as a silicon nitride film is sputtered to a thickness of 200 to 400 nm, and a passivation film 109 is formed. Thereafter, the gate insulating film and the passivation film 109 on a gate terminal (not shown) provided on a portion extended from the gate line 102 are removed, and an opening for the gate terminal is formed. Simultaneously, the passivation film 109 on a drain terminal (not shown) provided on a portion extended from the data line 106 is removed, and an opening for the drain terminal is formed. Simultaneously with the above, the passivation film 109 is opened, and a contact hole 110 for a common electrode, which is shown in FIG. 1, is formed. Subsequently, an ITO film with a thickness of 30 to 50 nm is sputtered thereon, and an interlayer contact 111 is patterned by a photolithography method and an etching method (refer to FIG. 1 and FIG. 3). Thus, a bottom gate TFT is completed.

On the surface of the substrate including this TFT, photosensitive heat-resistant resist made of novolac resin is applied such that a film thickness thereof after firing becomes approximately 2 µm. Subsequently, by the photolithography method, the novolac resin resist is left on the data line 106 and the gate line 102 excluding the gate line 102 in the vicinity of a columnar spacer, the rest is removed, and an organic insulating layer 112 is formed. Thereafter, the organic insulating layer 112 is melted by performing a heat treatment at a temperature of 120 to 160° C., and a cross-sectional edge of the organic insulating layer 112 is rounded. Thereafter, the organic insulating layer 112 is put into a kiln, and baked by being heated up to 220 to 260° C.

An ITO film with a thickness of 30 to 50 nm is sputtered on the substrate so as to coat the organic insulating layer 112. A common electrode 113 is formed by the photolithography method and the etching method. Besides, the ITO film for upper layer electrodes of the drain terminal and the gate terminal is left though the film is not illustrated. In this case, as shown in FIG. 1, the common electrode 113 is formed so as to have a shape parallel to the pixel electrode 108 in the bent shape pattern.

Moreover, the common electrode 113 is provided immediately above the data line 106 so as to coat the data line 106 while interposing the passivation film 109 of silicon nitride or the like and the insulating layer which is the organic insulating layer 112 therebetween. By coating the data line 106 with the common electrode 113, an electric line of force from the data line 106 is terminated at the common electrode 113, and the electric line of force from the data line 106 is made not to enter the pixel electrode 108. When parasitic capacitance between the data line 106 and the common electrode 113 immediately thereabove is large, problems of a signal delay and increase of power consumption may come out. In order to solve these problems, the organic insulating layer 112 containing the novolac resin as a main component is formed thick, and the parasitic capacitance is reduced sufficiently.

Figure 2:
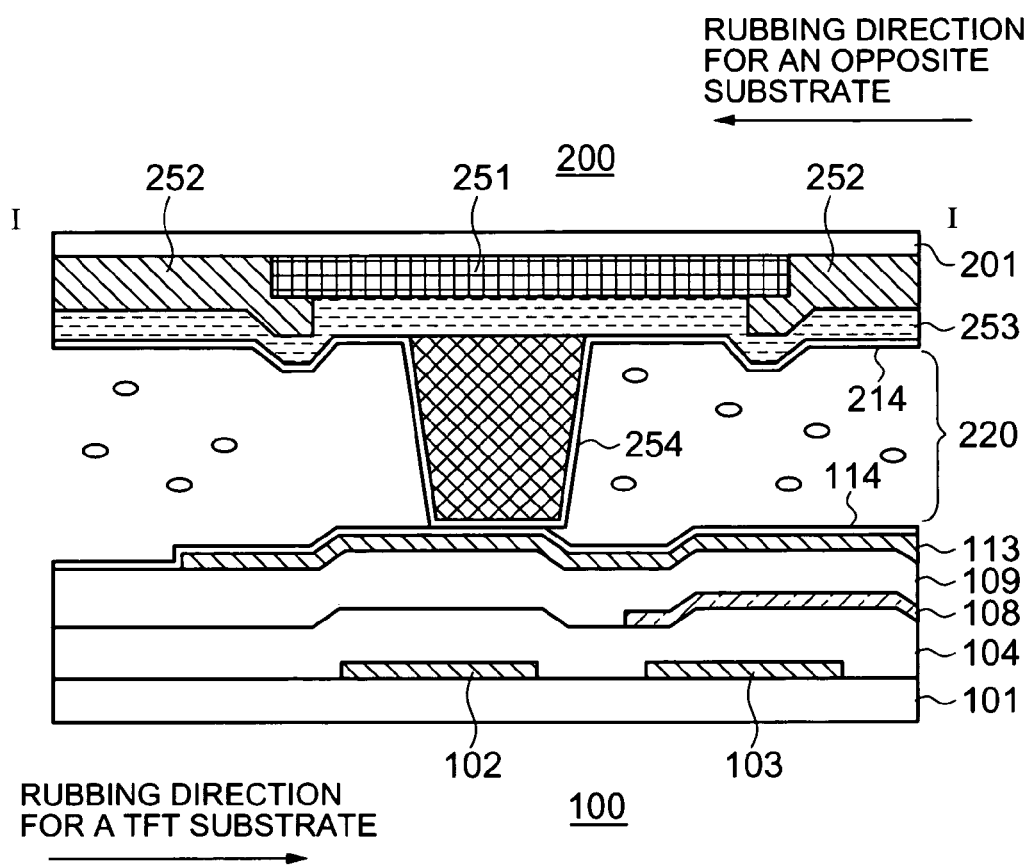
FIG. 2 is a cross-sectional view along a line I—I of FIG. 1.
Figure 3:
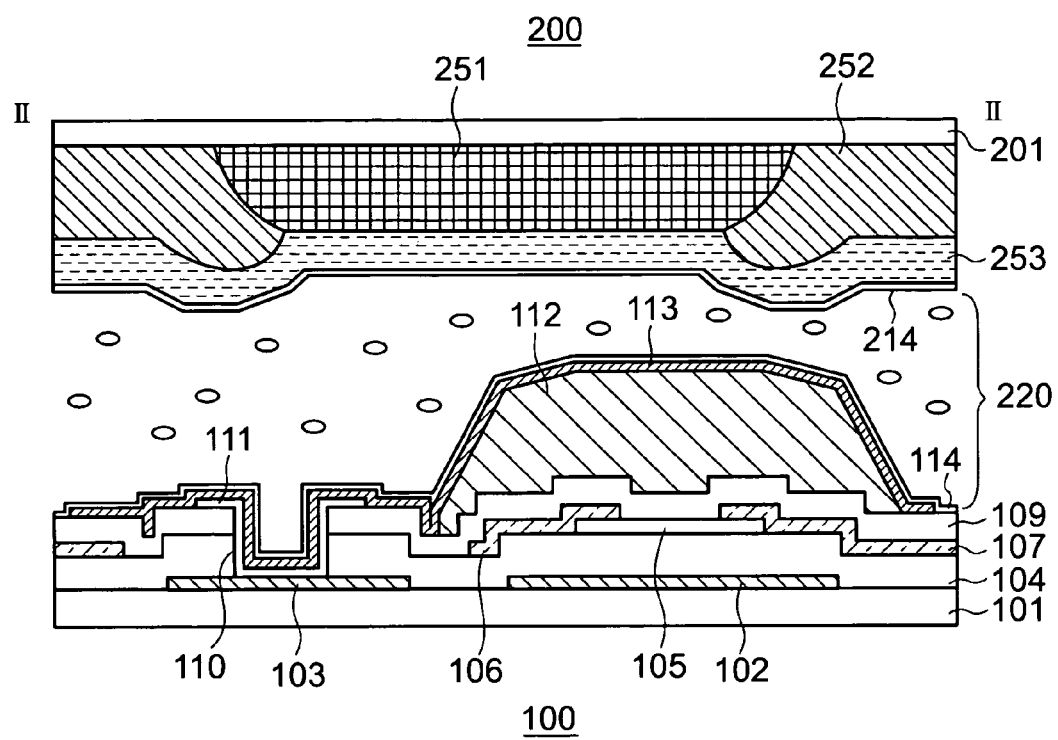
FIG. 3 is a cross-sectional view along a line II—II of FIG. 1.
Figure 4:
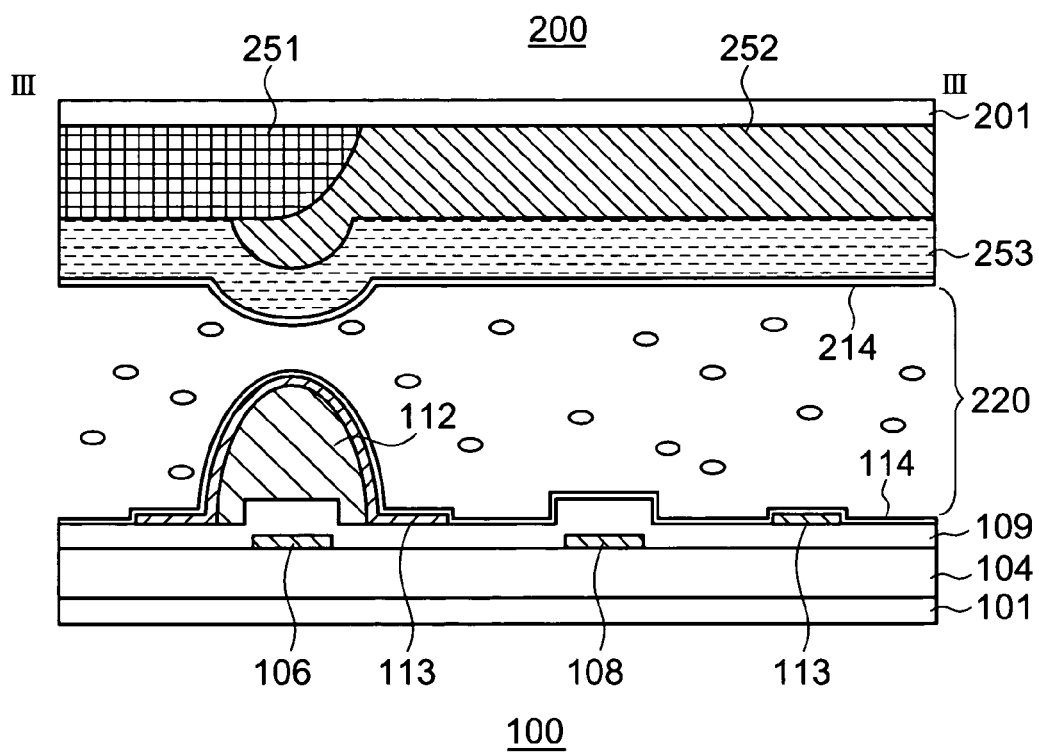
FIG. 4 is a cross-sectional view along a line III—III of FIG. 1.

On a TFT substrate 100 shown in FIG. 2 to FIG. 4, an orientation film 114 made of polyimide with a film thickness of 40 to 60 nm is further provided. On the other surface of the TFT substrate 100 than a surface on which the orientation film 114 is provided, a polarizing plate is provided.

Moreover, an opposite substrate 200 shown in FIG. 2 to FIG. 4 includes a second transparent substrate 201 made of a glass substrate, a black matrix 251 made of acrylic resin, a color layer 252 made of acrylic resin, and a planarizing film 253 made of acrylic resin. A film thickness of the black matrix 251 is, for example, 1.0 to 1.5 µm, and a film thickness of the color layer 252 is 1.5 to 2 µm. Moreover, a thickness of the planarizing film 253 is 0.8 to 1.3 µm.

Next, a resist film of photosensitive acrylic resin is applied on the planarizing film 253, and a columnar spacer 254 having a film thickness of 1.7 to 2.3 µm and a rectangular cross section is formed by the photolithography method. Thereafter, an orientation film 214 made of polyimide with a thickness of 40 to 60 µm is formed on the opposite substrate 200 so as to coat the columnar spacer 254. On the other surface of the opposite substrate 200 than a surface on which the columnar spacer 254 is formed, a conductive layer for preventing static electricity and a polarizing plate are provided.

Finally, the TFT substrate 100 and the opposite substrate 200 are disposed so as to be opposed to each other, liquid crystal is injected between both of the substrates, and a liquid crystal layer 220 is formed between both of the substrates. In this case, a top of the columnar spacer 254 is brought into contact with the orientation film 114 of the TFT substrate 100 while interposing the orientation film 214 therebetween. Moreover, as shown in FIG. 1 and FIG. 2, with regard to the columnar spacer 254, a main part of the top thereof is located above the gate line 102, but a part thereof overruns toward the common line 103.

More concretely, a center of the columnar spacer is not located above a center of the gate line 102 but displaced to a rubbing-incident direction, that is, displaced by approximately 3.5 μm from the center of the gate line 102 toward the common line 103. Simultaneously, the top of the columnar spacer 254 in contact with the orientation film 114 of the TFT substrate 100 is overrun by approximately 2.5 μm from above the gate line 102 toward above the common line 103. The center of the columnar spacer 254 and the top of the columnar spacer 254 are located as described above, and thus a liquid crystal display device with good image quality, in which "black haze" does not occur, is obtained.

Moreover, the center of the columnar spacer 254 is located while being shifted with respect to the gate line 102 in a direction reverse to the rubbing direction for the orientation film 214 of the opposite substrate 200. Therefore, an unrubbed portion of the orientation film 214 can be made to remain in a region where the black matrix 251 is formed, and light leakage due to an orientation failure can be hidden without lowering an aperture ratio. Moreover, a region where the columnar spacer 254 contacts with the TFT substrate is protruded from above the gate line 102 toward above the common line 103, and thus a contact area of the top of the columnar spacer 254 and the TFT substrate is reduced. Consequently, frictional force between the columnar spacer 254 and the TFT substrate 100 is reduced, and an occurrence of the black haze can be restricted.

Moreover, when micro irregularities are formed on the surfaces of the above-described orientation films 114 and 214, the frictional force between the columnar spacer 254 and the TFT substrate 100 can be further reduced, and the black haze can be eliminated completely. As methods of forming the micro irregularities on the surfaces of the orientation films 114 and 214, there are methods as will be described below.

Figure 5A:
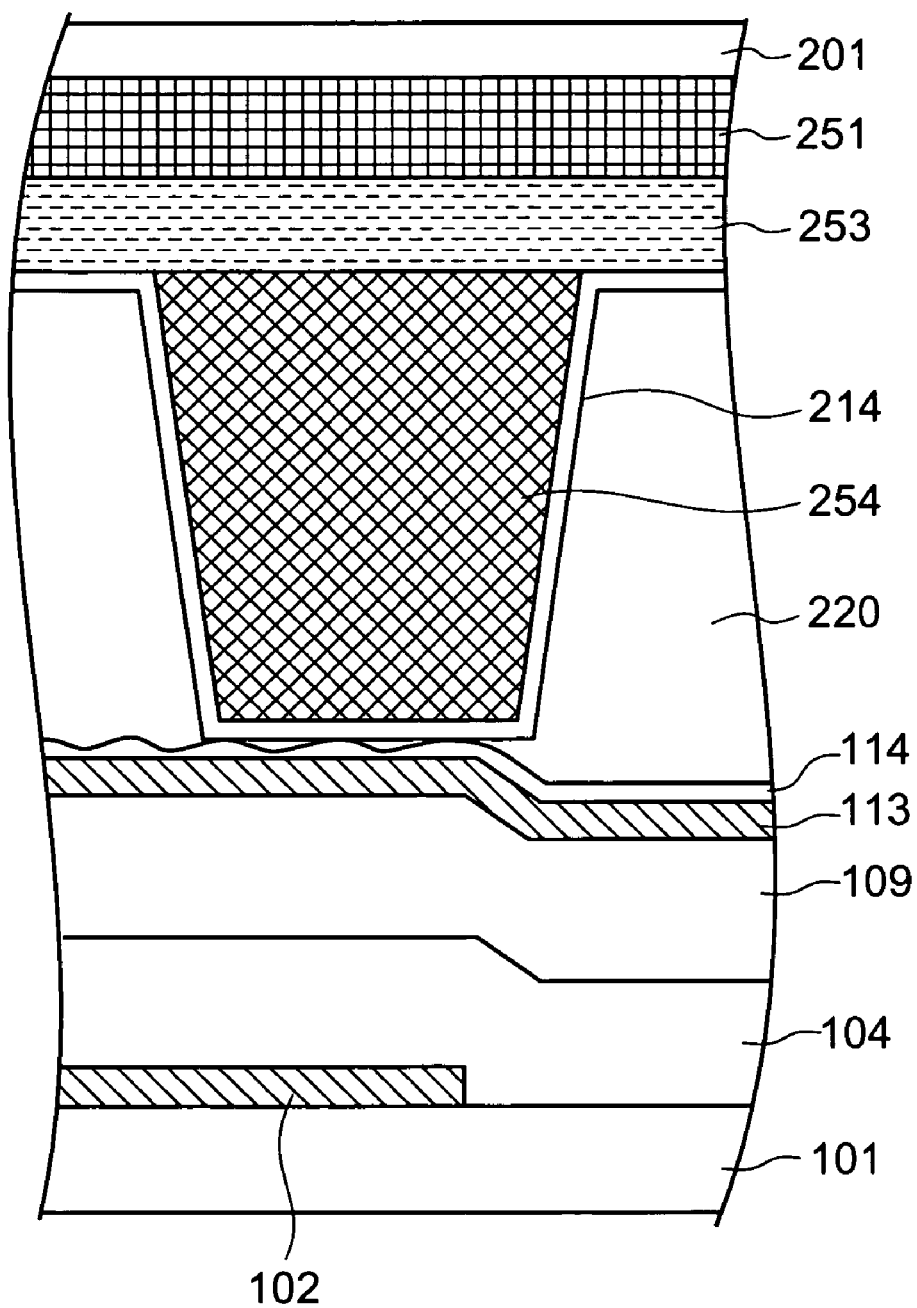
FIG. 5A is an enlarged cross-sectional view of a top of a columnar spacer, an orientation film of a TFT substrate opposite to the columnar spacer, on which an irregular surface is provided, and a vicinity thereof.

(1) The surface of at least one of the orientation films 114 and 214 is stamped by lithography on which a pattern of the micro irregularities is formed. FIG. 5A is an example, where the orientation film 114 is stamped to form an irregular surface thereon.

Figure 5B:
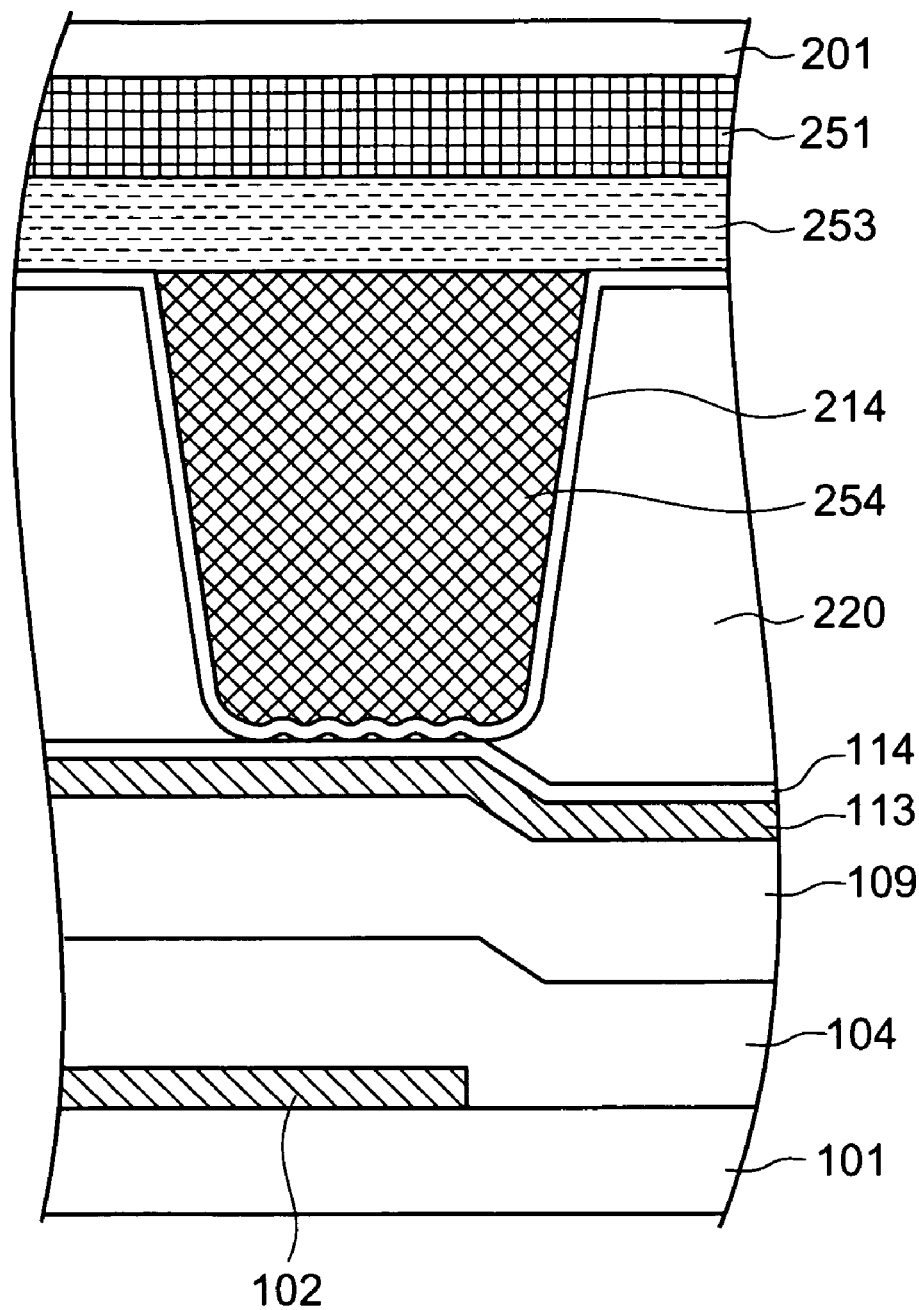
FIG. 5B is an enlarged cross-sectional view of the top of the columnar spacer, on which an irregular surface is provided, and a vicinity thereof.

(2) The irregularities are not formed on the surface of the orientation film, but as shown in FIG. 5B, the irregularities are formed on the top of the columnar spacer. As this method, two-stage exposure or halftone exposure is performed when the columnar spacer is formed by photolithography, and thus the irregularities are formed. For example, in the case of using negative photosensitive resist as a material of the columnar spacer, a portion thereof on which light has been incident is hardened and remains, and a portion thereof on which light has not been incident is melted and disappears by being developed. Accordingly, alight irradiation intensity is changed depending on positions on the photoresist by using two-stage exposure or halftone exposure, and thus a height of the columnar spacer is varied. Consequently, the irregularities are formed on the top of the columnar spacer.

As described above, the micro irregularities are provided on the contact portion of the top of the columnar spacer and the TFT substrate. Thus, the contact area of the top of the columnar spacer and the TFT substrate is reduced. As a result of this, even when external force is applied to a screen of the liquid crystal display device, frictional force generated between the TFT substrate and the opposite substrate can be reduced. Hence, even if a horizontal shift occurs between the TFT substrate and the opposite substrate when the external force is applied to the screen, both of the substrates can rapidly return to original positions thereof because the frictional force between both of the substrates is small. Hence, a phenomenon of the so-called "black haze" hardly occurs.

Although the present invention has been described as above by taking as an example the liquid crystal display device of the in-plane switching mode, the present invention is not one limited to this. For example, the present invention can be applied to all types of liquid crystal display devices as long as each of the liquid crystal display devices includes the columnar spacer between the TFT substrate and the opposite substrate and is configured such that the gate line and the common line are arranged parallel to each other on the TFT substrate.

In the liquid crystal display device of the present invention, the columnar spacer is provided above the black matrix of the opposite substrate disposed opposite to the TFT substrate, and the position of the top of the columnar spacer contacting with the TFT substrate is shifted from above the center of the gate line of the TFT substrate toward the common line parallel to the gate line. Thus, the portion of the orientation film material applied on the uppermost layer of the opposite substrate, the portion being shaded by the columnar spacer in the case of rubbing the orientation film material, can be made to remain in the black matrix of the opposite substrate. Furthermore, a structure is adopted, in which the top of the columnar spacer contacting with the TFT substrate is not entirely brought into contact with the TFT substrate, but the gap is partially provided between the columnar spacer and the TFT substrate. Thus, the frictional force between the top of the columnar spacer and the TFT substrate can be reduced. In addition, even if the horizontal shift occurs between the TFT substrate and the opposite substrate when the external force is applied to the screen of the liquid crystal display device, both of the substrates rapidly return to the original positions where they have been originally located. Thus, the occurrence of the black haze can be restricted.

While this invention has been described in connection with certain preferred embodiments, it is to be understood that the subject matter encompassed by way of this invention is not to be limited to those specific embodiments. On the contrary, it is intended for the subject matter of the invention to include all alternatives, modifications and equivalents as can be included within the spirit and scope of the following claims.

What is claimed is:

1. A liquid crystal display device including a first substrate, a second substrate, and a liquid crystal layer sandwiched between the first and second substrates, the device comprising, on the first substrate:
a gate line;
a common line parallel to the gate line;
a data line intersecting the gate line while sandwiching a gate insulating film on the gate line therebetween;
a first interlayer insulating film coating the data line; and
a first orientation film coating the first interlayer insulating film, and the device comprising, on the second substrate:
a light shielding film opposite to the gate line;
a second interlayer insulating film coating the light shielding film;

a columnar spacer located above the gate line apart from an intersection of the gate line and the data line and provided on the second interlayer insulating film; and a second orientation film coating the second interlayer insulating film and the columnar spacer, wherein a center of a top of the columnar spacer is shifted from above a widthwise center of the gate line toward above the common line, and the top of the columnar spacer partially overruns from above the gate line toward above the common line when viewed from the above, the top being directed to the first substrate.

2. The liquid crystal display device according to claim 1, wherein, in a portion of the top of the columnar spacer, the portion overrunning from above the gate line when viewed from the above, and the top being directed to the first substrate, at least an end portion toward the common line is avoided contacting with the first orientation film.

3. The liquid crystal display device according to claim 1, wherein at least one of a surface of the second orientation film coating the top of the spacer and a surface of the first orientation film opposite to the top of the spacer includes an irregular surface.

4. The liquid crystal display device according to claim 3, wherein the irregular surface of the second orientation film coating the top of the spacer is a surface formed by applying the second orientation film on the irregular surface of the top of the spacer.

5. The liquid crystal display device according to claim 1, further comprising, on the first substrate, a common electrode connected to the common line and formed between the first interlayer insulating film and the first orientation film, wherein the common electrode is located nearer the liquid crystal layer than the data line, includes the data line when viewed from the above, and coats a protruding organic insulating film provided between the first interlayer insulating film and the first orientation film above the data line.

6. The liquid crystal display device according to claim 5, further comprising a pixel electrode parallel to the common electrode, the pixel electrode being formed between the first interlayer insulating film and the first orientation film, wherein liquid crystal molecules of the liquid crystal layer are rotated by applying voltage between the common electrode and the pixel electrode.

7. The liquid crystal display device according to claim 1, wherein a plurality of the gate lines and a plurality of the data lines are provided individually on the first substrate, a plurality of pixels are defined by a plurality of regions surrounded by the plurality of gate lines and the plurality of data lines, and on the second substrate, as well as a light shielding film opposite to the gate lines, a color layer is provided in the same layer as the light shielding film correspondingly to the plurality of pixels.

* * * * *

UNITED STATES PATENT AND TRADEMARK OFFICE
CERTIFICATE OF CORRECTION

PATENT NO. : 7,046,327 B2
APPLICATION NO. : 10/833318
DATED : May 16, 2006
INVENTOR(S) : Mamoru Okamoto et al.

It is certified that error appears in the above-identified patent and that said Letters Patent is hereby corrected as shown below:

On the title page item (73), should read --NEC LCD Technologies, Ltd. (JP)--

Signed and Sealed this

Twenty-second Day of May, 2007

JON W. DUDAS
*Director of the United States Patent and Trademark Office*